US012790242B2

(12) United States Patent
Stevens

(10) Patent No.: US 12,790,242 B2
(45) Date of Patent: Nov. 10, 2026

(54) POOL CHLORINATION ASSEMBLY

(71) Applicant: Cynthia Stevens, Oak Ridge, MO (US)

(72) Inventor: Cynthia Stevens, Oak Ridge, MO (US)

( * ) Notice: Subject to any disclaimer, the term of this patent is extended or adjusted under 35 U.S.C. 154(b) by 735 days.

(21) Appl. No.: 18/106,795

(22) Filed: Feb. 7, 2023

(65) Prior Publication Data

US 2024/0262722 A1 Aug. 8, 2024

(51) Int. Cl.

| | |
|---|---|
| ***C02F 1/50*** | (2023.01) |
| ***C02F 1/00*** | (2023.01) |
| ***C02F 1/46*** | (2023.01) |
| ***C02F 1/467*** | (2023.01) |
| ***C02F 1/76*** | (2023.01) |
| ***E04H 4/12*** | (2006.01) |
| *C02F 103/00* | (2006.01) |
| *C02F 103/42* | (2006.01) |

(52) U.S. Cl.

CPC ................ *C02F 1/50* (2013.01); *C02F 1/001* (2013.01); *C02F 1/4674* (2013.01); *C02F 1/76* (2013.01); *E04H 4/1263* (2013.01); *E04H 4/1281* (2013.01); *C02F 2103/007* (2013.01); *C02F 2103/42* (2013.01); *C02F 2201/008* (2013.01); *C02F 2201/009* (2013.01); *C02F 2303/04* (2013.01)

(58) Field of Classification Search

CPC .......... C02F 1/50; C02F 1/001; C02F 1/4674; C02F 1/76; C02F 2103/007; C02F 2103/42; C02F 2201/008; C02F 2201/009; C02F 2303/04; E04H 4/1263; E04H 4/1281

USPC ...................................... 210/167.11; 422/265

See application file for complete search history.

(56) References Cited

U.S. PATENT DOCUMENTS

| | | | | |
|---|---|---|---|---|
| 4,088,880 | A | 5/1978 | Walsh | |
| 6,119,957 | A | 9/2000 | Liu | |
| 6,792,956 | B2 * | 9/2004 | Bredo | E04H 4/1654 134/44 |
| 7,101,475 | B1 | 9/2006 | Maaske | |
| 7,118,678 | B2 | 10/2006 | Porat | |
| D747,439 | S | 1/2016 | Byers | |
| 10,472,264 | B2 | 11/2019 | Simonsen | |
| 11,180,389 | B1 | 11/2021 | Lane | |
| 2005/0067300 | A1 * | 3/2005 | Tremblay | C02F 1/46104 422/23 |

(Continued)

FOREIGN PATENT DOCUMENTS

| | | | | |
|---|---|---|---|---|
| CN | 110272104 A * | 9/2019 | | C02F 1/50 |
| WO | WO-2023151923 A1 * | 8/2023 | | C02F 1/687 |

OTHER PUBLICATIONS

Machine-generated English translation of CN 110272104, generated on Jun. 26, 2025.*

*Primary Examiner* — Fred Prince

(57) ABSTRACT

A pool chlorination assembly includes a float housing that can be placed in water of a swimming pool. The float housing has an intake to allow the water to enter the float housing. A chlorine tablet is positionable within the float housing to release chlorine into the water. A pumping unit is integrated into the lid and the pumping unit has a spraying element extending upwardly from the lid. The pumping unit is in fluid communication with the intake in the float housing to pump the water in the float housing outwardly through the spraying element for releasing the chlorinated water into the pool. A plurality of solar panels is mounted to the lid for powering the pumping unit.

8 Claims, 7 Drawing Sheets

(56) References Cited

U.S. PATENT DOCUMENTS

| | | | | |
|---|---|---|---|---|
| 2021/0371309 | A1 | 12/2021 | Gallant | |
| 2023/0250660 | A1* | 8/2023 | L'Hoest | C02F 1/76 137/268 |

* cited by examiner

POOL CHLORINATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to chlorination devices and more particularly pertains to a new chlorination device for chlorinating water in a swimming pool. The device includes a float housing which contains a chlorine tablet and the float housing can be floated in water of a swimming pool. The device includes a pumping unit integrated into the float housing for pumping water into the float housing to chlorinate the water. The device includes a spraying element integrated into the float housing for spraying the chlorinated water in a fountain to re-circulate the chlorinated water back into the swimming pool.

(2) Description of Related Art Including Information Disclosed Under 37 CFR 1.97 and 1.98

The prior art relates to chlorination devices including a variety of decorative fountain devices that each at least includes a float housing that can be floated in a swimming pool and a spraying element for spraying water in a fountain. The prior art discloses a variety of automated swimming pool skimmers for collecting debris from a swimming pool. The prior art discloses a floating chemical dispenser for releasing chlorine into a swimming pool.

BRIEF SUMMARY OF THE INVENTION

An embodiment of the disclosure meets the needs presented above by generally comprising a float housing that can be placed in water of a swimming pool. The float housing has an intake to facilitate the water to enter the float housing. A chlorine tablet is positionable within the float housing to release chlorine into the water. A pumping unit is integrated into the lid and the pumping unit has a spraying element extending upwardly from the lid. The pumping unit is in fluid communication with the intake in the float housing to pump the water in the float housing outwardly through the spraying element thereby releasing the chlorinated water into the pool. A plurality of solar panels is mounted to the lid for powering the pumping unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
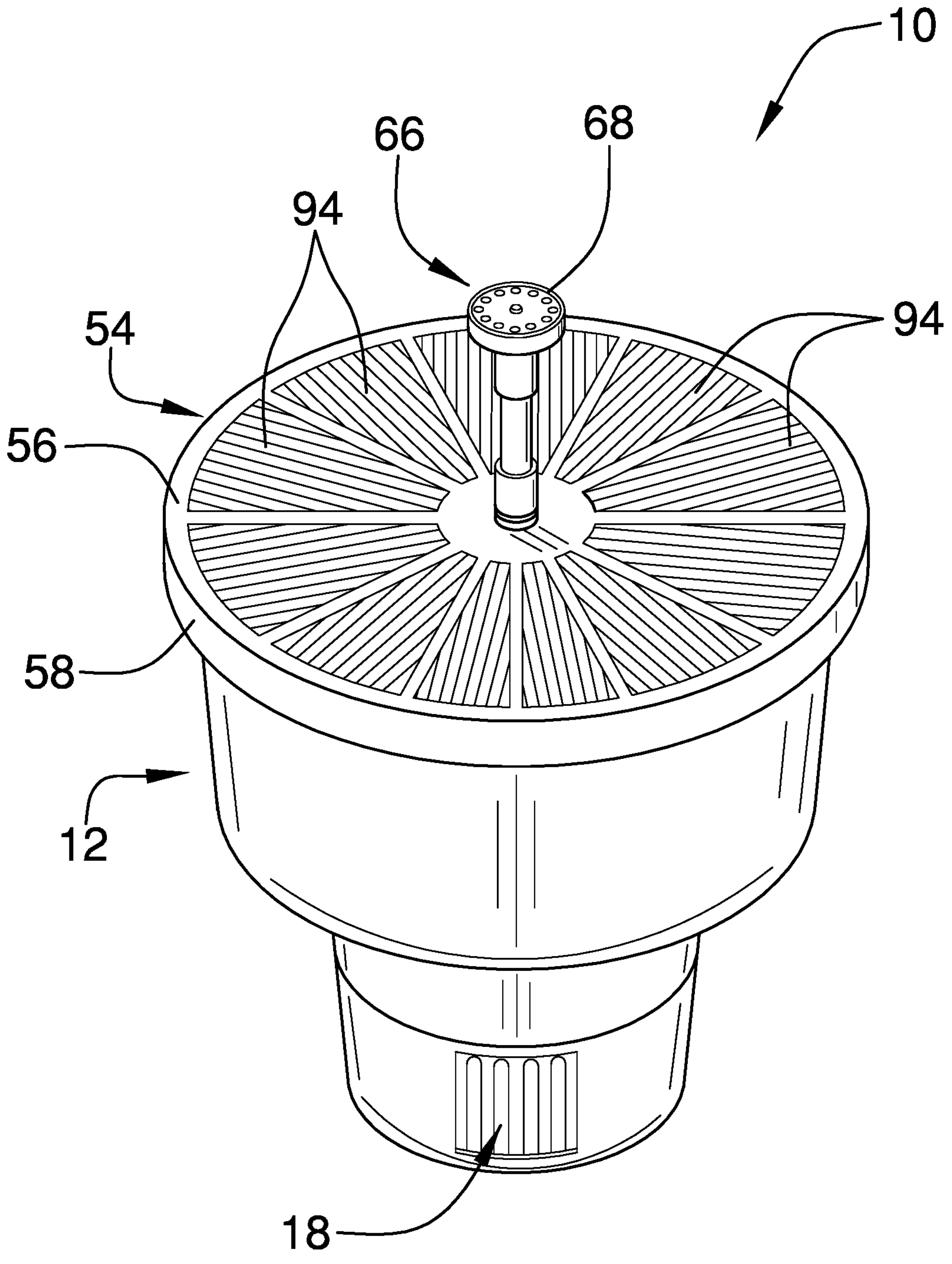
FIG. 1 is a top perspective view of a pool chlorination assembly according to an embodiment of the disclosure.
Figure 2:
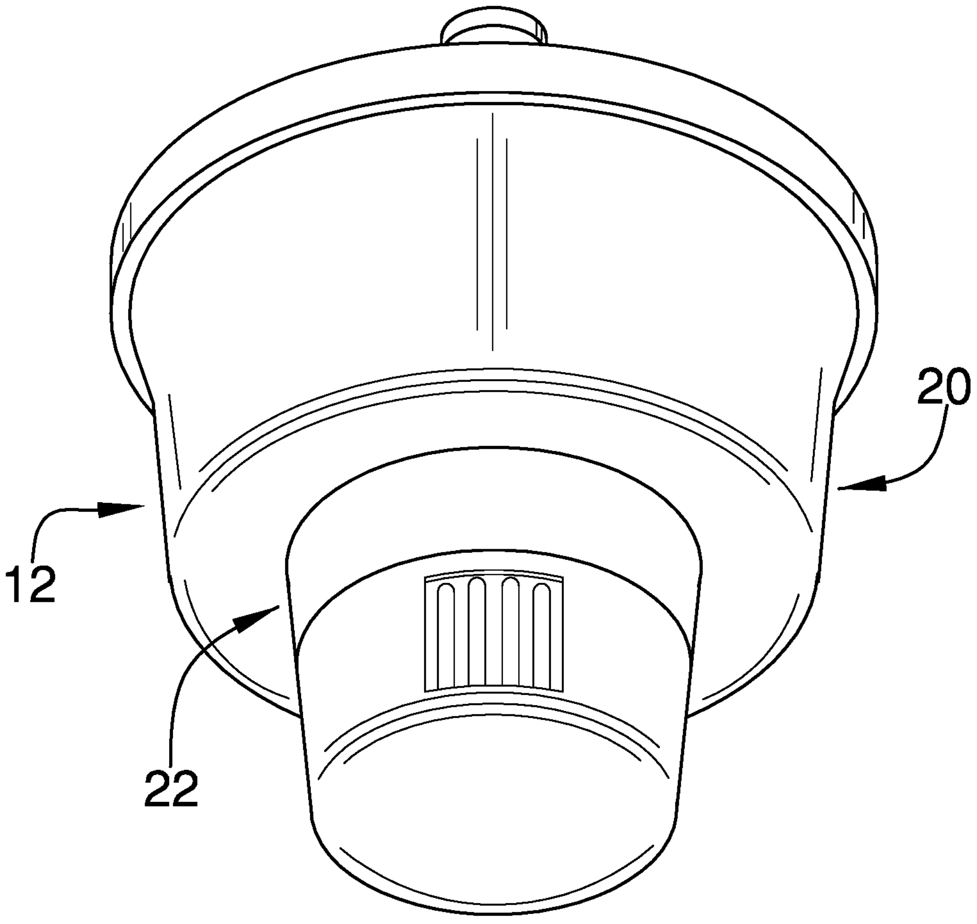
FIG. 2 is a bottom perspective view of an embodiment of the disclosure.
Figure 3:
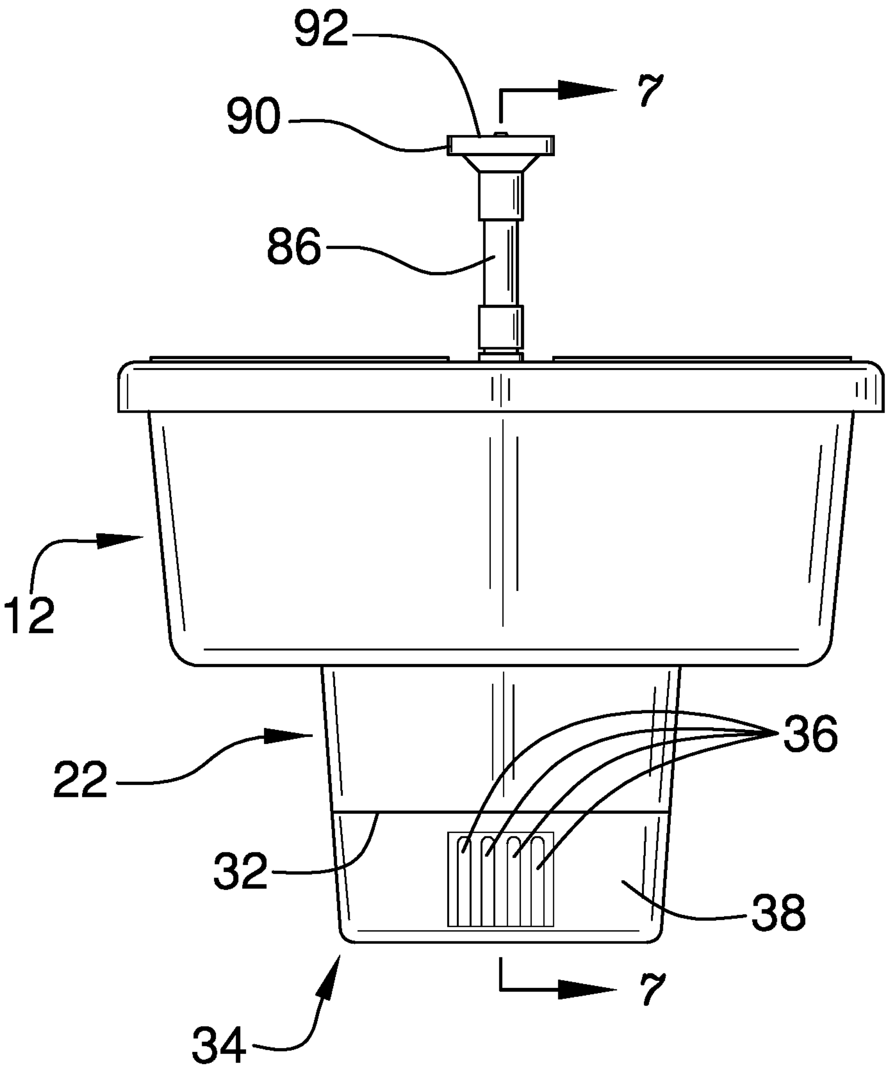
FIG. 3 is a front view of an embodiment of the disclosure.
Figure 4:
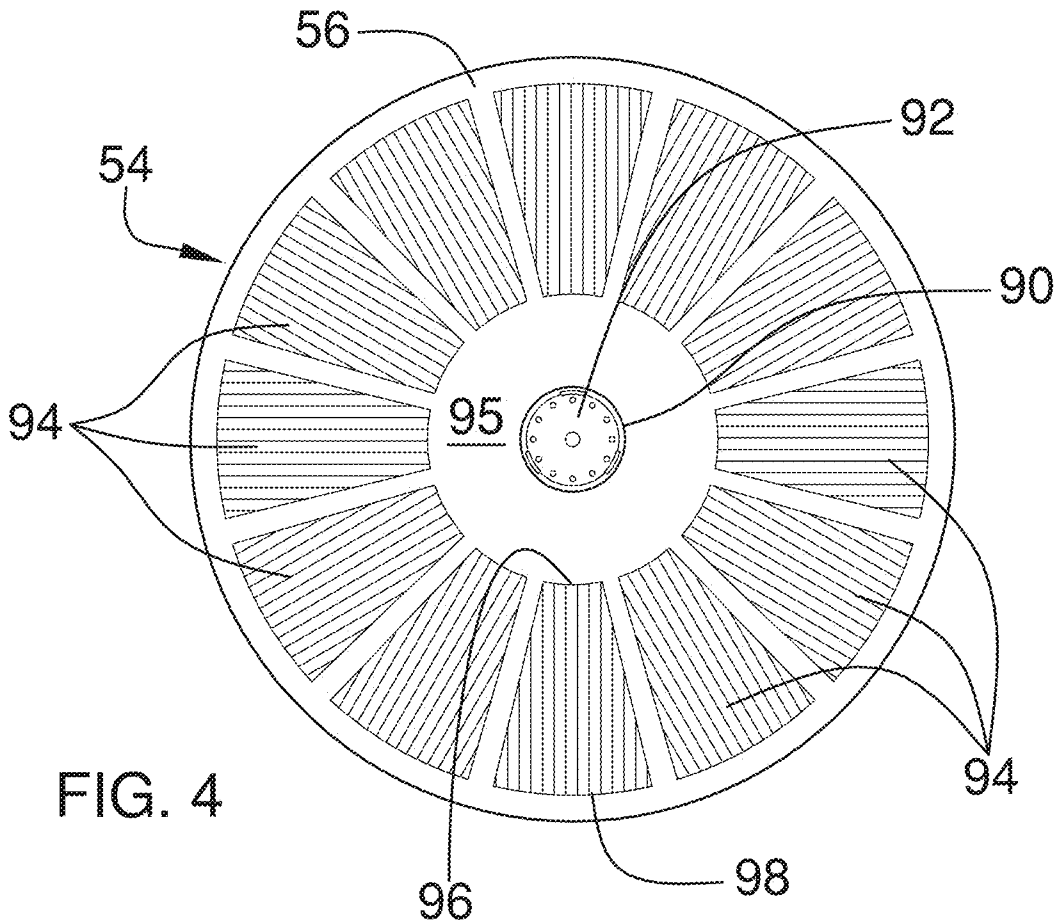
FIG. 4 is a top view of an embodiment of the disclosure.
Figure 5:
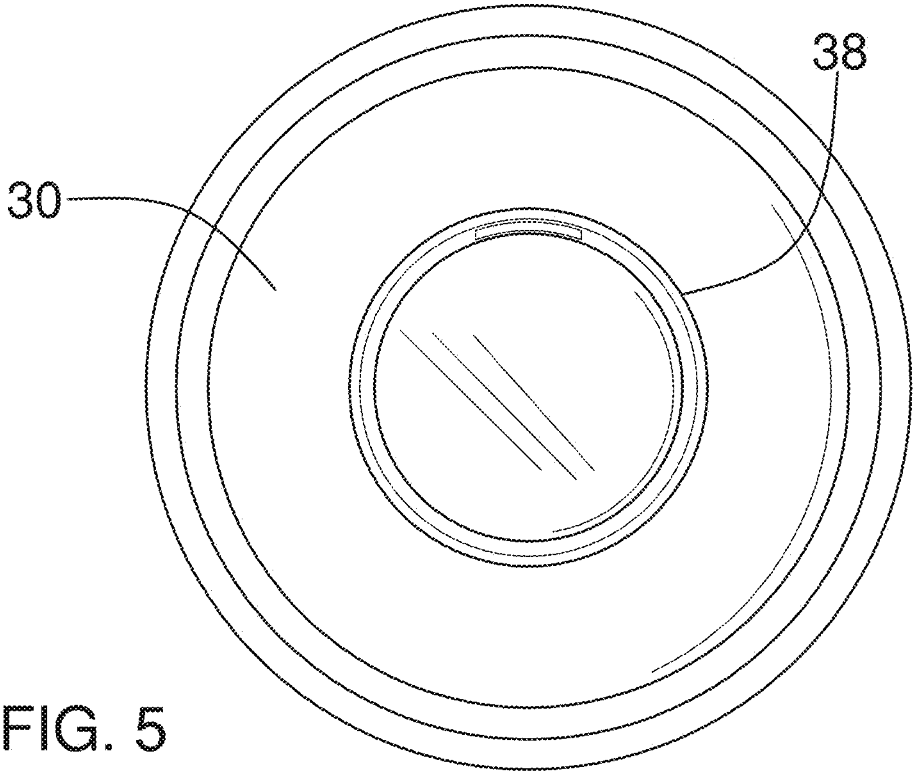
FIG. 5 is a bottom view of an embodiment of the disclosure.
Figure 6:
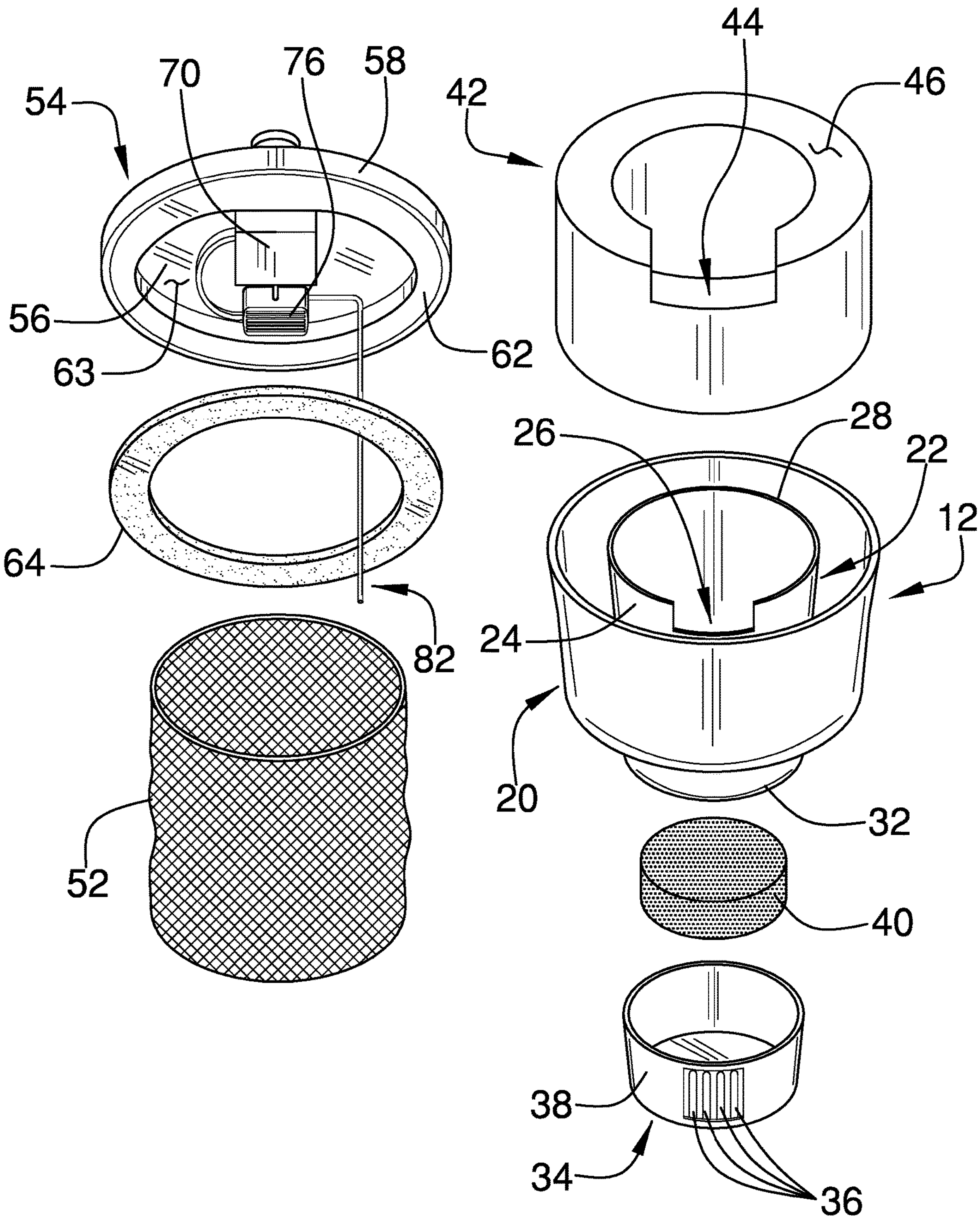
FIG. 6 is an exploded perspective view of an embodiment of the disclosure.
Figure 7:
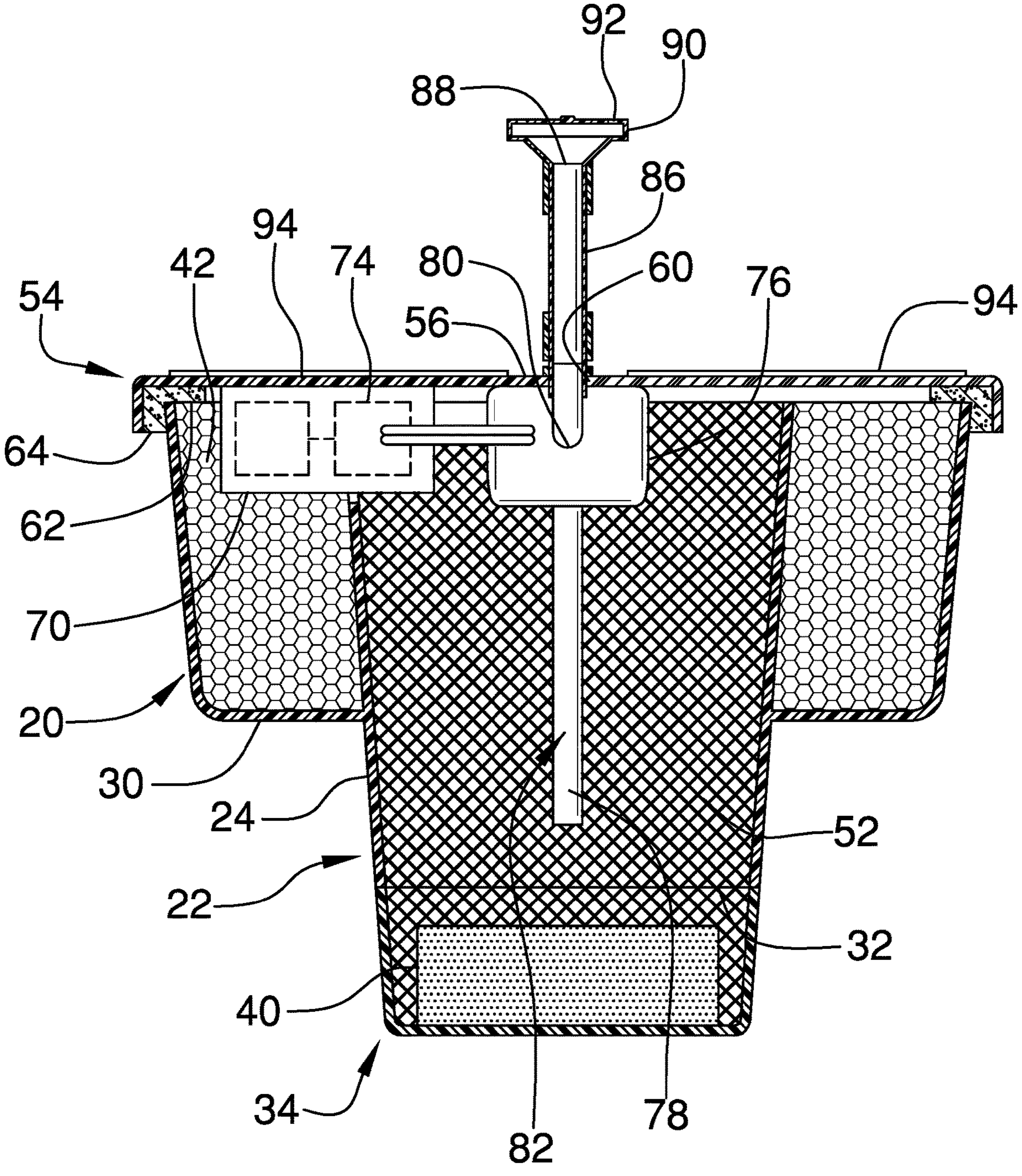
FIG. 7 is a cross sectional view taken along line 7-7 of FIG. 3 of an embodiment of the disclosure.
Figure 8:
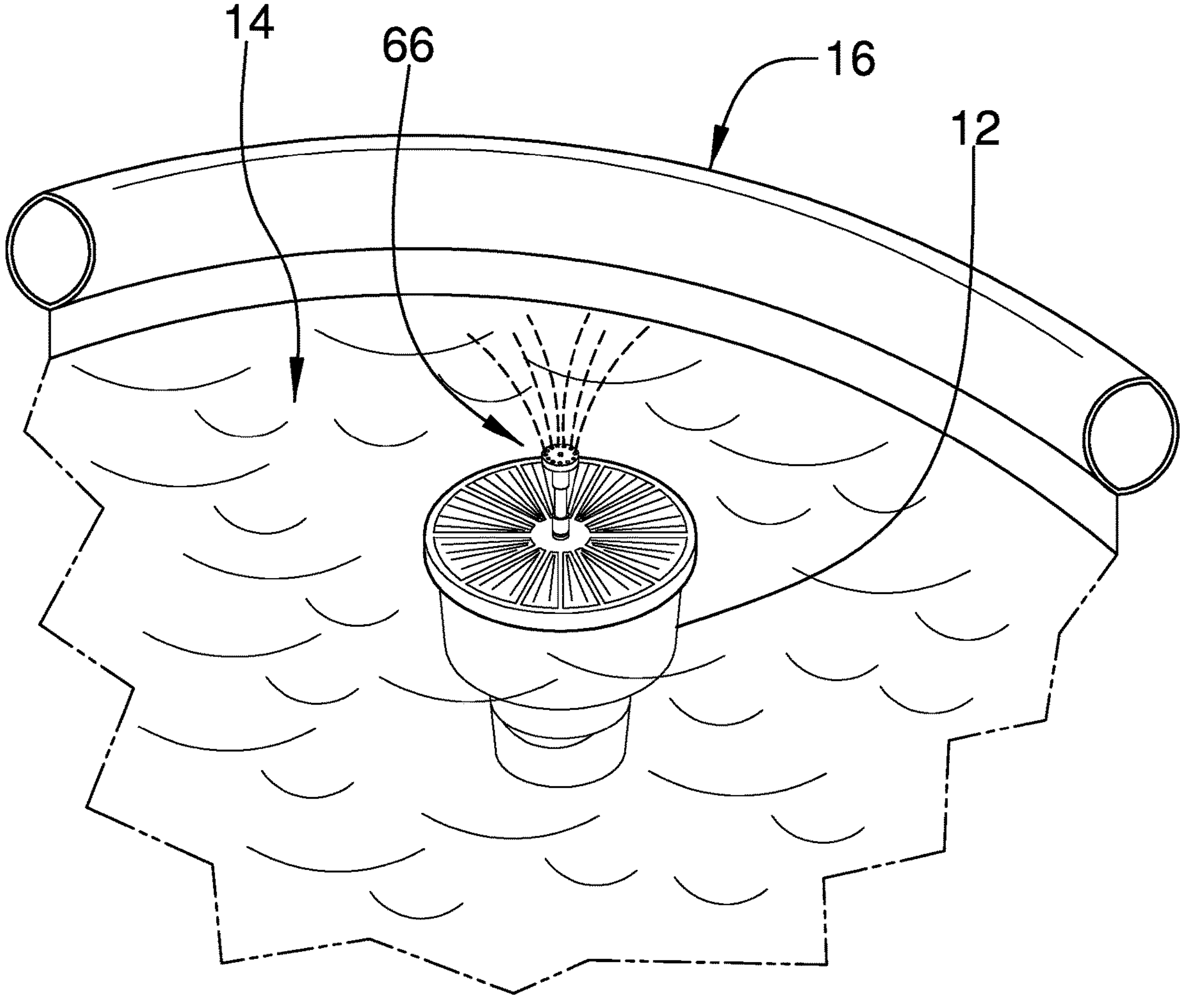
FIG. 8 is a perspective in-use view of an embodiment of the disclosure.

With reference now to the drawings, and in particular to FIGS. 1 through 8 thereof, a new chlorination device embodying the principles and concepts of an embodiment of the disclosure and generally designated by the reference numeral 10 will be described.

As best illustrated in FIGS. 1 through 8, the pool chlorination assembly 10 generally comprises a float housing 12 which is comprised of a fluid impermeable material such that the float housing 12 can be placed in water 14 of a swimming pool 16. The float housing 12 has an intake 18 to facilitate the water 14 to enter the float housing 12. The float housing 12 comprises a cup portion 20 and a sleeve portion 22 that is concentrically disposed in the cup portion 20. An outer wall 24 of the sleeve portion 22 has a slot 26 extending downwardly from a top end 28 of the sleeve portion 22. Furthermore, the sleeve portion 22 extends downwardly beyond a bottom wall 30 of the cup portion 20 such that a bottom end 32 of the sleeve portion 22 is spaced below the bottom wall 30 of the cup portion 20.

The float housing 12 includes a chlorine cup 34 that is removably attachable to the bottom end 32 of the sleeve portion 22 such that the chlorine cup 34 closes the bottom end 32. The chlorine cup 34 has a plurality of openings 36 each extending through an outer wall 38 of the chlorine cup 34 such that the plurality of openings 36 defines the intake 18 of the float housing 12. A chlorine tablet 40 is positionable within the float housing 12 to release chlorine into the water 14 thereby chlorinating the swimming pool 16. The chlorine tablet 40 is positionable in the chlorine cup 34 such that the chlorine tablet 40 is exposed to water 14 which flows inwardly through the plurality of openings 36 in the outer wall 24 of the chlorine cup 34. The chlorine tablet 40 may be a water soluble chlorine tablet of any conventional design that is commonly employed in swimming pool maintenance.

A float 42 is insertable into the float housing 12 and the float 42 is comprised of a buoyant material to facilitate the float housing 12 to float 42 in the water 14. The float 42 comprises an annular ring which has an outside diameter that is less than an inside diameter of the cup portion 20 of the float housing 12. In this way the float 42 can be inserted into the cup portion 20 of the float housing 12 having the float 42 extending around the sleeve portion 22. The float 42 has a groove 44 extending downwardly from a top surface 46 of the float 42 and the groove 44 is aligned with the slot 26 in the outer wall 24 of the sleeve portion 22. The float 42 extends between the bottom wall 30 of the cup portion 20 and the upper edge 28 of the outer wall 24 of the cup portion 20. A mesh bag 52 is insertable into the sleeve portion 22 of the float housing 12 and the mesh bag 52 extends into the chlorine cup 34 when the chlorine cup 34 is attached to the sleeve portion 22. The mesh bag 52 is comprised of a particulate filtering 62 material to filter particles from the water 14 flowing through the plurality of openings 36 in the outer wall 24 of the chlorine cup 34.

A lid 54 is provided and the lid 54 is attachable to the float housing 12. The lid 54 has a top wall 56 and a perimeter wall 58 extending downwardly from the top wall 56 and the lid 54 has a hole 60 extending through the top wall 56. The hole 60 is centrally located on the top wall 56 and the top wall 56 has a ring 62, disposed on a bottom surface 63 of the top wall 56, which extends around the perimeter wall 58. An annular gasket 64 is positionable between the ring 62 on the top wall 56 of the lid 54 and the upper edge 48 of the outer wall 50 of the cup portion 20 of the float housing 12. The annular gasket 64 is comprised of a fluid impermeable material to inhibit water 14 from passing between the lid 54 and the float housing 12.

A pumping unit 66 is integrated into the lid 54 and the pumping unit 66 has a spraying element 68 extending upwardly from the lid 54. The pumping unit 66 is in fluid communication with the intake 18 in the float housing 12 when the lid 54 is attached to the flout housing 12. In this way the pumping unit 66 can pump the water 14 in the float housing 12 outwardly through the spraying element 68 thereby releasing the chlorinated water 14 into the pool 16. The pumping unit 66 comprises an electronics housing 70 that is attached to the bottom surface 63 of the top wall 56 of the lid 54. The electronics housing 70 is positioned in the slot 26 in the outer wall 24 of the cup and the groove 44 in the top surface 46 of the float 42 when the lid 54 is attached to the float housing 12.

The pumping unit 66 includes a control circuit 74 that is positioned within the electronics housing 70 to protect the control circuit 74 from being exposed to the water 14. A pump 76 is attached to the bottom surface 63 of the top wall 56 and the pump 76 is electrically coupled to the control circuit 74. The pump 76 has an input 78 and an output 80 and the input 78 comprises a tube 82 extending downwardly from the pump 76. The tube 82 extends into the sleeve portion 22 of the float housing 12 when the lid 54 is attached to the cup portion 20 of the float housing 12. In this way the pump 76 can urge the chlorinated water 14 inwardly through the tube 82 and outwardly through the output 80 when the pump 76 is turned on. The pump 76 may comprise an electric fluid pump or other similar type of pump.

The pumping unit 66 includes a pipe 86 that is fluidly coupled to the output 80 of the pump 76 to receive the chlorinated water 14 pumped by the pump 76. The pipe 86 extends upwardly through the hole 60 in the top wall 56 of the lid 54 and the pipe 86 has an upper end 88. The pumping unit 66 includes a spray head 90 that is coupled to the upper end 88 of the pipe 86 such that the spray head 90 defines the spraying element 68 of the pumping unit 66. The spray head 90 has a foraminous face 92 to spray the chlorinated water 14 outwardly from the foraminous face 92 thereby re-circulating the chlorinated water 14 into the pool 16.

A plurality of solar panels 94 is mounted to the lid 54 thereby facilitating each of the plurality of solar panels 94 to be exposed to sunlight. Each of the plurality of solar panels 94 is electrically coupled to the pumping unit 66 for powering the pumping unit 66. Each of the plurality of solar panels 94 is positioned on a top surface 95 of the top wall 56 of the lid 54. Furthermore, each of the plurality of solar panels 94 tapers between a front edge 96 and a back edge 98 such that each of the plurality of solar panels 94 has a wedge shape. The plurality of solar panels 94 is arranged to radiate around the pipe 86 of the pumping unit 66.

In use, the chlorine tablet 40 is placed in the chlorine cup 34 and the chlorine cup 34 is attached to the sleeve portion 22 of the float housing 12. The float housing 12 is positioned in the water 14 in the swimming pool 16 such that the sleeve portion 22 of the float housing 12 extends downwardly in the water 14 thereby facilitating the chlorine tablet 40 to be submerged. The pump 76 urges the water 14 outwardly through the spray head 90 to facilitate the chlorinated water 14 to be re-circulated into the swimming pool 16. Furthermore, the spray head 90 produces a visually appealing display similar to a fountain and the spray head 90 produces the relaxing sound of running water 14. The mesh screen filters the water 14 as the pump 76 urges the water 14 inwardly through the tube 82. The mesh screen is removed from the float housing 12 for rinsing when the mesh screen becomes filled with particles and the chlorine tablet 40 is replaced when the chlorine tablet 40 is dissolved.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pool chlorination assembly for chlorinating and filtering pool water with solar energy, said assembly comprising:

a float housing being comprised of a fluid impermeable material wherein said float housing is configured to be placed in water of a swimming pool, said float housing having an intake wherein said intake is configured to facilitate the water to enter said float housing;

a chlorine tablet being positionable within said float housing wherein said chlorine tablet is configured to release chlorine into the water thereby chlorinating the swimming pool;

a float being insertable into said float housing, said float being comprised of a buoyant material wherein said float is configured to facilitate said float housing to float in the water;

a lid being attachable to said float housing;

a pumping unit being integrated into said lid, said pumping unit having a spraying element extending upwardly from said lid, said pumping unit being in fluid communication with said intake in said float housing when said lid is attached to said float housing wherein said pumping unit is configured to pump the water in said float housing outwardly through said spraying element thereby releasing the chlorinated water into the pool; and a plurality of solar panels, each of said plurality of solar panels being mounted to said lid wherein each of said plurality of solar panels is configured to be exposed to sunlight, each of said plurality of solar panels being electrically coupled to said pumping unit for powering said pumping unit.

2. The assembly according to claim 1, wherein:

said float housing comprises a cup portion and a sleeve portion being concentrically disposed in said cup portion, an outer wall of said sleeve portion having a slot extending downwardly from a top end of said sleeve portion, said sleeve portion extending downwardly beyond a bottom wall of said cup portion such that a bottom end of said sleeve portion is spaced below said bottom wall of said cup portion;

said float housing includes a chlorine cup being removably attachable to said bottom end of said sleeve portion such that said chlorine cup closes said bottom end, said chlorine cup having a plurality of openings each extending through an outer wall of said chlorine cup such that said plurality of openings defines said intake of said float housing; and said chlorine tablet is positionable in said chlorine cup wherein said chlorine tablet is configured to be exposed to water which flows inwardly through said plurality of openings in said outer wall of said chlorine cup.

3. The assembly according to claim 2, wherein said float comprises an annular ring having an outside diameter being less than an inside diameter of said cup portion of said float housing thereby facilitating said float to be inserted into said cup portion of said float housing having said float extending around said sleeve portion, said float having a groove extending downwardly from a top surface of said float, said groove being aligned with said slot in said outer wall of said sleeve portion, said float extending between said bottom wall of said cup portion and an upper edge of an outer wall of said cup portion.

4. The assembly according to claim 2, further comprising a mesh bag being insertable into said sleeve portion of said float housing, said mesh bag extending into said chlorine cup when said chlorine cup is attached to said sleeve portion, said mesh bag comprising a particulate filtering material wherein said mesh bag is configured to filter particles from the water flowing through said plurality of openings in said outer wall of said chlorine cup.

5. The assembly according to claim 3, wherein:

said lid has a top wall and a perimeter wall extending downwardly from said top wall, said lid having a hole extending through said top wall, said hole being centrally located on said top wall, a bottom surface of said top wall having a ring extending around said perimeter wall;

said assembly includes an annular gasket being positionable between said ring on said top wall of said lid and said upper edge of said outer wall of said cup portion of said float housing, said annular gasket being comprised of a fluid impermeable material wherein said gasket is configured to inhibit water from passing between said lid and said float housing; and said pumping unit comprises an electronics housing being attached to said bottom surface of said top wall of said lid, said electronics housing being positioned in said slot in said outer wall of said cup and said groove in said top surface of said float when said lid is attached to said float housing.

6. The assembly according to claim 5, wherein said pumping unit includes:

a control circuit being positioned within said electronics housing wherein said electronics housing is configured to protect said control circuit from being exposed to the water;

a pump being attached to said bottom surface of said top wall, said pump being electrically coupled to said control circuit, said pump having an input and an output, said input comprising a tube extending downwardly from said pump, said tube extending into said sleeve portion of said float housing when said lid is attached to said cup portion of said float housing wherein said pump is configured to urge the chlorinated water inwardly through said tube and outwardly through said output when said pump is turned on;

a pipe being fluidly coupled to said output of said pump wherein said pipe is configured to receive the chlorinated water pumped by said pump, said pipe extending upwardly through said hole in said top wall of said lid, said pipe having an upper end; and a spray head being coupled to said upper end of said pipe such that said spray head defines said spraying element of said pumping unit, said spray head having a foraminous face wherein said foraminous face is configured to spray the chlorinated water outwardly from said spray head thereby recirculating the chlorinated water into the pool.

7. The assembly according to claim 5, wherein each of said plurality of solar panels is positioned on a top surface of said top wall of said lid, each of said plurality of solar panels tapering between a front edge and a back edge such that each of said plurality of solar panels has a wedge shape, said plurality of solar panels being arranged to radiate around said pipe of said pumping unit.

8. A pool chlorination assembly for chlorinating and filtering pool water with solar energy, said assembly comprising:

a float housing being comprised of a fluid impermeable material wherein said float housing is configured to be placed in water of a swimming pool, said float housing having an intake wherein said intake is configured to facilitate the water to enter said float housing, said float housing comprising a cup portion and a sleeve portion being concentrically disposed in said cup portion, an outer wall of said sleeve portion having a slot extending downwardly from a top end of said sleeve portion, said sleeve portion extending downwardly beyond a bottom wall of said cup portion such that a bottom end of said sleeve portion is spaced below said bottom wall of said cup portion, said float housing including a chlorine cup being removably attachable to said bottom end of said sleeve portion such that said chlorine cup closes said bottom end, said chlorine cup having a plurality of openings each extending through an outer wall of said chlorine cup such that said plurality of openings defines said intake of said float housing;

a chlorine tablet being positionable within said float housing wherein said chlorine tablet is configured to release chlorine into the water thereby chlorinating the swimming pool, said chlorine tablet being positionable in said chlorine cup wherein said chlorine tablet is configured to be exposed to water which flows inwardly through said plurality of openings in said outer wall of said chlorine cup;

a float being insertable into said float housing, said float being comprised of a buoyant material wherein said float is configured to facilitate said float housing to float in the water, said float comprising an annular ring having an outside diameter being less than an inside diameter of said cup portion of said float housing thereby facilitating said float to be inserted into said cup portion of said float housing having said float extending around said sleeve portion, said float having a groove extending downwardly from a top surface of said float, said groove being aligned with said slot in said outer wall of said sleeve portion, said float extending between said bottom wall of said cup portion and an upper edge of an outer wall of said cup portion;

a mesh bag being insertable into said sleeve portion of said float housing, said mesh bag extending into said chlorine cup when said chlorine cup is attached to said sleeve portion, said mesh bag comprising a particulate filtering material wherein said mesh bag is configured to filter particles from the water flowing through said plurality of openings in said outer wall of said chlorine cup;

a lid being attachable to said float housing, said lid having a top wall and a perimeter wall extending downwardly from said top wall, said lid having a hole extending through said top wall, said hole being centrally located on said top wall, a bottom surface of said top wall having a ring extending around said perimeter wall;

an annular gasket being positionable between said ring on said top wall of said lid and said upper edge of said outer wall of said cup portion of said float housing, said annular gasket being comprised of a fluid impermeable material wherein said gasket is configured to inhibit water from passing between said lid and said float housing;

a pumping unit being integrated into said lid, said pumping unit having a spraying element extending upwardly from said lid, said pumping unit being in fluid communication with said intake in said float housing when said lid is attached to said float housing wherein said pumping unit is configured to pump the water in said float housing outwardly through said spraying element thereby releasing the chlorinated water into the pool, said pumping unit comprising:

an electronics housing being attached to said bottom surface of said top wall of said lid, said electronics housing being positioned in said slot in said outer wall of said cup and said groove in said top surface of said float when said lid is attached to said float housing;

a control circuit being positioned within said electronics housing wherein said electronics housing is configured to protect said control circuit from being exposed to the water;

a pump being attached to said bottom surface of said top wall, said pump being electrically coupled to said control circuit, said pump having an input and an output, said input comprising a tube extending downwardly from said pump, said tube extending into said sleeve portion of said float housing when said lid is attached to said cup portion of said float housing wherein said pump is configured to urge the chlorinated water inwardly through said tube and outwardly through said output when said pump is turned on;

a pipe being fluidly coupled to said output of said pump wherein said pipe is configured to receive the chlorinated water pumped by said pump, said pipe extending upwardly through said hole in said top wall of said lid, said pipe having an upper end; and a spray head being coupled to said upper end of said pipe such that said spray head defines said spraying element of said pumping unit, said spray head having a foraminous face wherein said foraminous face is configured to spray the chlorinated water outwardly from said spray head thereby recirculating the chlorinated water into the pool; and a plurality of solar panels, each of said plurality of solar panels being mounted to said lid wherein each of said plurality of solar panels is configured to be exposed to sunlight, each of said plurality of solar panels being electrically coupled to said pumping unit for powering said pumping unit, each of said plurality of solar panels being positioned on a top surface of said top wall of said lid, each of said plurality of solar panels tapering between a front edge and a back edge such that each of said plurality of solar panels has a wedge shape, said plurality of solar panels being arranged to radiate around said pipe of said pumping unit.

* * * * *